UNITED STATES PATENT OFFICE.

JULES A. ARRAULT, OF NEW YORK, N. Y., AND JULES SCHMERBER AND CHARLES SCHMERBER, OF PATERSON, NEW JERSEY.

PROCESS FOR MANUFACTURING NITRO-DERIVATIVES FROM CELLULOSE, &c.

SPECIFICATION forming part of Letters Patent No. 230,216, dated July 20, 1880.

Application filed December 4, 1879.

*To all whom it may concern:*

Be it known that we, JULES A. ARRAULT, of the city, county, and State of New York, and JULES SCHMERBER and CHARLES SCHMERBER, of Paterson, in the county of Passaic and State of New Jersey, have invented a new and Improved Process for Manufacturing Nitro-Derivatives from Cellulose, Glucose, Starch, &c., of which the following is a specification.

The process used in manufacturing nitro-derivates, such as pyroxyline, nitro-glucose, &c., consists in treating cellulose, starch, glucose, &c., by a mixture of nitric and sulphuric acid or a mixture of a nitrate and sulphuric acid. In both cases a large excess of the above ingredients must be used in order to have every particle or molecule in contact with the transforming agent, though only a small fraction of the said agent is assimilated, and there is consequently a waste which greatly increases the cost of manufacture.

In our improved process we produce the nitro-derivatives by treating the cellulose, starch, glucose, &c., by nitric acid in a gaseous state, in the fumes of nitric acid, by which process we use practically but little more acid than the theoretical quantity required to transform the substances named to their nitro-derivatives. There is evidently great economy by our process.

In carrying out our process, the apparatus used may consist of an air-tight chamber, made of any suitable material, in which cellulose in any form—such as cotton, flax, ramie, wood fiber, or starch, dextrine, &c.—is to be exposed in a suitable manner to the gaseous nitric acid, which is to be produced in a separate apparatus by any of the known processes, such as treating in a retort nitrate of soda by sulphuric acid.

By regulation of the quantity of niric acid and temperature we can produce all the nitro-derivatives obtained by usual processes much more economically, as the gaseous acid will penetrate and mix intimately with every particle of the substances subjected to its action, so that the conversion takes place with the use of but slightly more acid than the theoretical quantity.

Having thus described our invention, we claim as new and desire to secure by Letters Patent—

1. The use of nitric acid in a gaseous state for manufacturing nitro-derivatives, such as pyroxyline, nitro-glucose, &c., substantially as described.

2. The process for treating cellulose, glucose, starch, &c., for the production of nitro-derivatives, such as pyroxyline, &c., which consists in subjecting the substances to be transformed to the action of the fumes of nitric acid or nitric acid in a gaseous state, substantially as described.

JULES A. ARRAULT.
JULES SCHMERBER.
CHARLES SCHMERBER.

Witnesses:
GEO. D. WALKER,
C. SEDWICK.